Feb. 15, 1944. H. WAYER 2,341,966
BALANCED GATE VALVE
Filed Aug. 6, 1942
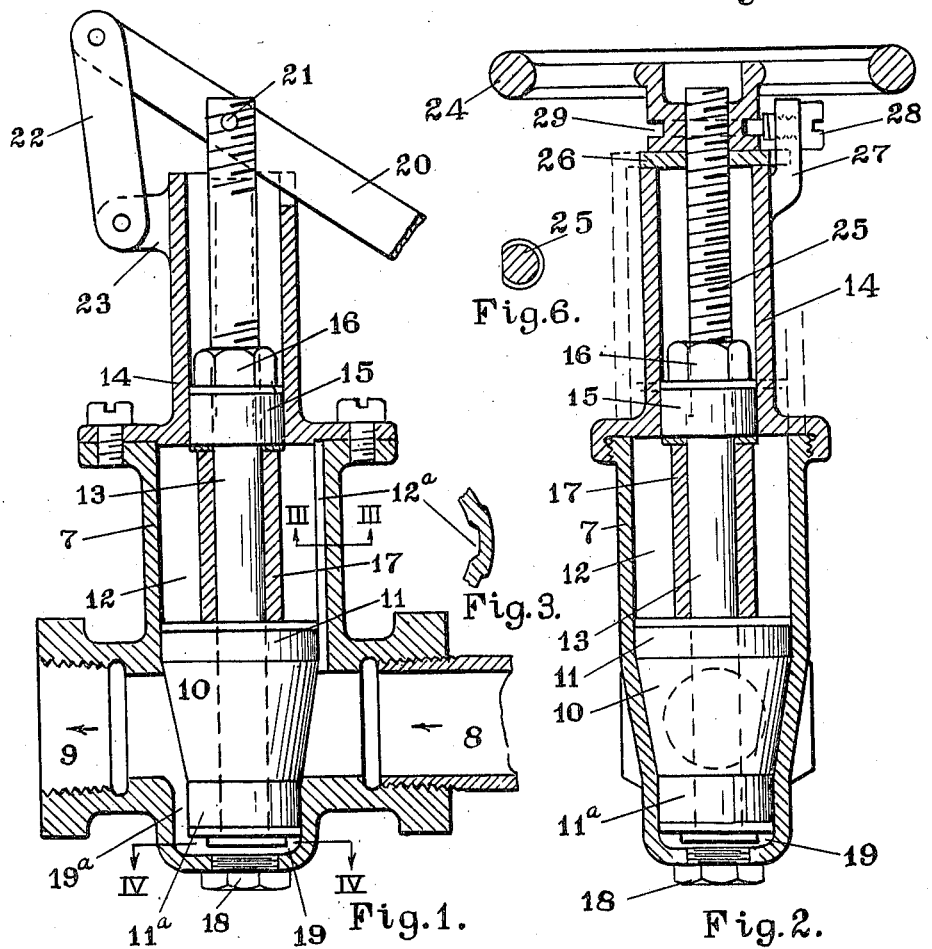
Inventor
HENRY WAYER
By Finckel & Finckel
Attorney Patented Feb. 15, 1944

2,341,966

UNITED STATES PATENT OFFICE 2,341,966

BALANCED GATE VALVE

Henry Wayer, Columbus, Ohio, assignor to Wayer & Norris, Inc., Columbus, Ohio, a corporation of Ohio Application August 6, 1942, Serial No. 453,826

1 Claim. (Cl. 251—51)

This invention relates to balanced valves for controlling or regulating the flow of a liquid or gas under pressure and has for its principal object to equalize the pressure of the fluid on the gate or plug and thereby prevent that member from sticking and permitting it to be more easily operated. A further object is to provide a construction whereby when the valve is initially opened the flow is expedited and the accumulation of foreign substances in the valve casing can be easily removed. Other objects will appear from the disclosure herein.

The invention in its preferred form is shown in the accompanying drawing in which Fig. 1 is an axial section of the casing and pipe connection showing in full a plug or gate and one means for operating same.

Fig. 2 is a similar view taken on a plane at right angles to that on which Fig. 1 is taken as respects the lower portion of the casing and the valve therein but illustrating a modified means for opening and closing the valve.

Fig. 3 is a horizontal section of a portion of the casing taken on the line III—III, Fig. 1.

Fig. 4 is a horizontal section on the line IV—IV, Fig. 1, looking down.

Fig. 5 is a plan view of a cap and retainer member for the casing shown in connection with Fig. 2.

Fig. 6 is a cross section of the threaded stem shown in Fig. 2.

In the views, and referring first more especially to Fig. 1, the character 7 designates the body or plug receiving portion of the casing which has a threaded port for the intake pipe 8 and a threaded outlet port 9 for the discharge side.

The casing has between its said intake and outlet a seat for a frusto-conical portion 10 of the gate or valve. The said gate or valve has a cylindrical packing 11 at its top that fits and slides in a chamber 12 formed in the casing above the axis of the intake and outlet referred to. The wall of the chamber 12 is provided with a groove or channel 12ª through which the fluid under pressure is admitted from the intake or pressure side of the casing into chamber 12. The lower end of the frusto-conical plug is provided with a suitable packing at 11ª and securing means therefor.

The character 13 designates the stem to which the gate or valve is secured as indicated by broken lines and extends through the axis of the gate or valve and the packings thereon. The said stem 13 extends upward through the chamber 12 and beyond where it is screw threaded.

The chamber 12 is defined at the top by the flange of a tubular extension 14 of the casing and a packing 15 fitted on the stem 13 and secured by a nut 16 pressed toward a spacer tube 17 placed on the stem between the packing 11 or ring thereon at the top of the gate or valve and the packing 15 or a metal ring thereon.

The lower end of the gate or valve and the packing 11ª thereon extends into a well 19 when closed, said well being circular in the major portion of its circumference to receive said lower end of the gate or valve and its packing but is enlarged at the exit side as shown at 19ª to permit the prompt discharge of the fluid under pressure when the gate is even slightly raised. The lower wall of said well can have a threaded opening with a removable closing plug 18 as shown in Figs. 1 and 2 to afford access to parts on the lower end of the stem or to remove accumulation or obstruction in the well.

In Fig. 1 the means for moving the valve or gate consists of a lever 20 pivoted at 21 in the upper end of the stem and having the end of its shorter arm thereof pivoted to one end of a link 22 the other end of which is pivoted to an ear 23 fixed on the upper portion of the casing.

From the construction shown and described it will be observed that when the valve is closed flow from the outlet port 9 is cut off but the pressure of the fluid at the intake or pressure port extends into the chamber 12 through the channel 12ª and therefore by the law of equality of pressure is exerted on the top of the valve or gate in the same degree as upon the intake side of the valve or gate. This fact together with the fact that the instant the valve is raised the rapid flow of the fluid from below the lower end of the valve or gate renders the operation of the valve very easy. In other words the pressure on the valve is substantially balanced when closed and also balanced when opened.

On the upper end of the casing in Fig. 2 there is provided a cap plate 26 having two spaced lugs 26ª between which extends from the casing an upstanding fixed lug 27 so that said cap plate and the stem 25 are held from turning. Engaging a threaded hole in the upper end of said upstanding lug 27 is a screw threaded pin 28 in said lug 27 engaging said hole, said threaded pin having a plain end to enter a groove 29 in a hub on the hand wheel. In this construction the screw 25 is fed up or down by turning the hand wheel on the stem. Said pin 28 can be removed and the hand wheel and cap taken off when access to the interior of the upper portion of the casing is desired.

Referring more particularly to Figs. 2-6 inclusive the construction of the gate or valve and the top pressure chamber therefor are substantially the same. The difference between the construction of Fig. 1 and Fig. 2 consists principally in the employment of a hand wheel 24 engaging the threaded stem 25 having a flat side in Fig. 2 instead of a lever as on Fig. 1 to operate the valve.

The forms, size, material and construction of the parts and the position of the invention in use can be changed within the skill of a mechanic without departing from the gist of the invention as claimed.

What I claim is:

A balanced longitudinally reciprocating valve structure including, in combination, a casing having an intake and an outlet for a fluid subject to pressure, a closing valve seat between said intake and outlet, a lateral tubular extension of said casing between said intake and outlet in line with said valve seat forming a pressure chamber, a pressure passage from the intake side of the valve casing to said pressure chamber, a valve for said seat having a packing at its upper end fitting in said pressure chamber and movable thereinto, a stem connected with said valve for raising and lowering the valve and a packing means secured on said stem spaced from said valve and fitting in the tubular extension and movable with said stem for closing the outer end of said pressure chamber.

HENRY WAYER.